(12) United States Patent
Zheng (10) Patent No.: US 11,443,070 B2
(45) Date of Patent: Sep. 13, 2022

(54) BIOMETRIC FEATURE ATTACK OBJECTS AND BIOMETRIC FEATURE ATTACK TEST SYSTEMS

(71) Applicant: ALIPAY (HANGZHOU) INFORMATION TECHNOLOGY CO., LTD., Zhejiang (CN)

(72) Inventor: Jianxu Zheng, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/362,578

(22) Filed: Jun. 29, 2021

(65) Prior Publication Data
US 2022/0012368 A1 Jan. 13, 2022

(30) Foreign Application Priority Data
Jul. 13, 2020 (CN) .......................... 202010670687.5

(51) Int. Cl.
*G06F 21/00* (2013.01)
*G06F 21/71* (2013.01)
*G06K 9/00* (2022.01)
*G06F 21/32* (2013.01)

(52) U.S. Cl.
CPC .............. *G06F 21/71* (2013.01); *G06F 21/32* (2013.01); *G06K 9/00718* (2013.01)

(58) Field of Classification Search
None
See application file for complete search history.

(56) References Cited

U.S. PATENT DOCUMENTS

| 2002/0070663 A1 | 6/2002 | Ogura et al. |
| 2008/0208495 A1* | 8/2008 | Xu .................... G01R 31/2829 702/65 |
| 2015/0070037 A1 | 3/2015 | Pragada et al. |

(Continued)

FOREIGN PATENT DOCUMENTS

| CN | 105654167 | 6/2016 |
| CN | 106126418 | 11/2016 |

(Continued)

OTHER PUBLICATIONS

Chinese First Search Report in Chinese Application No. 202010670687.5 dated Aug. 26, 2020, 2 pages (with English translation).

(Continued)

*Primary Examiner* — Jeffrey C Pwu
*Assistant Examiner* — William A Corum, Jr.
(74) *Attorney, Agent, or Firm* — Fish & Richardson P.C.

(57) ABSTRACT

Methods, systems, and apparatus for operations for performing biometric feature attack tests. An example system includes a biometric feature attack object, comprising a substrate, a biometric feature attachment part, and a conductive part, wherein: the substrate comprises a biometric feature carrying area and a pressing area, and the biometric feature carrying area and the pressing area are respectively disposed on two opposite sides of the substrate; the biometric feature attachment part is disposed in the biometric feature carrying area; and the conductive part is disposed in the pressing area or the biometric feature carrying area.

15 Claims, 4 Drawing Sheets

(56) References Cited

U.S. PATENT DOCUMENTS

| | | | | |
|---|---|---|---|---|
| 2016/0019408 | A1* | 1/2016 | Liu | G06K 9/0002 |
| | | | | 382/124 |
| 2017/0331474 | A1* | 11/2017 | Jiao | G01B 7/023 |
| 2018/0106881 | A1 | 4/2018 | Östlund | |
| 2018/0357644 | A1* | 12/2018 | Tabe | G06Q 20/40145 |
| 2019/0376853 | A1* | 12/2019 | Huang | H05K 1/144 |

FOREIGN PATENT DOCUMENTS

| | | |
|---|---|---|
| CN | 206657086 | 11/2017 |
| CN | 107995951 | 5/2018 |
| CN | 108475334 | 8/2018 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

New Media Technology, Basic Features and Basic Applications of QR Codes, Shang Hengzhi (ed), Sep. 30, 2017, pp. 118-119 (no English translation).

Extended European Search Report in European Application No. 21179928.3, dated Dec. 8, 2021, 9 pages.

* cited by examiner

BIOMETRIC FEATURE ATTACK OBJECTS AND BIOMETRIC FEATURE ATTACK TEST SYSTEMS

CROSS-REFERENCE TO RELATED APPLICATIONS

This application claims priority to Chinese Patent Application No. 202010670687.5, filed on Jul. 13, 2020, which is hereby incorporated by reference in its entirety.

TECHNICAL FIELD

The present specification relates to the field of computer technologies, and in particular, to biometric feature attack objects and biometric feature attack test systems.

BACKGROUND

Currently, with rapid development of mobile communications technologies, there are increasingly more types of devices capable of performing biometric recognition, for example, smartphones. To ensure the security of a biometric recognition process, the security of the biometric recognition device needs to be detected.

However, in an automatic biometric feature detection process, many attack materials such as paper and a transparent film are not electrically conductive. A human hand is electrically conductive, and can trigger a touchscreen to perform biometric recognition. Therefore, the performance and the security of the biometric recognition device are usually manually detected when using the attack material. However, in the process of manually performing biometric recognition, there is high consumption of human resources, a long test period, and a large operation error. Therefore, a technical solution with lower consumption of human resources, a shortened test period, and a decreased test error needs to be provided.

SUMMARY

Embodiments of the present specification are intended to provide biometric feature attack objects and biometric feature attack test systems, to provide a technical solution with lower labor costs, a shortened test period, and a decreased test error.

To solve the previous technical problem, the embodiments of the present specification are implemented as follows:

According to a first aspect, embodiments of the present specification provide a biometric feature attack object, including a substrate, a biometric feature attachment part, and a conductive part. The substrate includes a biometric feature carrying area and a pressing area, and the biometric feature carrying area and the pressing area are respectively disposed on two opposite sides of the substrate. The biometric feature attachment part is disposed in the biometric feature carrying area. The conductive part is disposed in the pressing area or the biometric feature carrying area.

According to a second aspect, embodiments of the present specification provide a biometric feature attack object, including a biometric feature attachment part and a conductive part. The conductive part includes a biometric feature carrying area and a pressing area, and the biometric feature carrying area and the pressing area are respectively disposed on two opposite sides of the conductive part. The biometric feature attachment part is disposed in the biometric feature carrying area.

According to a third aspect, embodiments of the present specification provide a biometric feature attack test system, including a controller, a mechanical arm, a camera component, and a biometric feature attack object. The camera component is configured to obtain the biometric feature attack object needed for performing a biometric recognition attack, and send information about a current position of the biometric feature attack object to the controller. The controller is configured to control, based on the information about the current position of the biometric feature attack object, the mechanical arm to select the biometric feature attack object, and place the biometric feature attack object in a target detection area. The camera component is configured to detect whether the biometric feature attack object is in the target detection area, and send information about a placement position of the biometric feature attack object in the target detection area to the controller when detecting that the biometric feature attack object is not in the target detection area. The controller is configured to control, based on the information about the placement position, the mechanical arm to adjust the placement position of the biometric feature attack object in the target detection area, so that the biometric feature attack object is placed at a target position for biometric recognition in the target detection area, and control the mechanical arm to perform a pressing operation on a pressing area of the biometric feature attack object by simulating a pressing action of a finger, to perform a biometric recognition attack test.

BRIEF DESCRIPTION OF DRAWINGS

To describe the technical solutions in the embodiments of the present specification or in the existing technology more clearly, the following briefly describes the accompanying drawings needed for describing the embodiments or the existing technology. Clearly, the accompanying drawings in the following description are merely some of the embodiments described in the present specification. A person of ordinary skill in the art can further derive other drawings from these accompanying drawings without creative efforts.

DETAILED DESCRIPTION OF EMBODIMENTS

To achieve the objective of the present specification, the embodiments of the present specification provide a biometric feature attack object and a biometric feature attack test system. The biometric feature attack object includes a substrate, a biometric feature attachment part, and a conductive part. The substrate includes a biometric feature carrying area and a pressing area, and the biometric feature carrying area and the pressing area are respectively disposed on two opposite sides of the substrate. The biometric feature attachment part is disposed in the biometric feature carrying area, and the conductive part is disposed in the pressing area or the biometric feature carrying area. As such, by disposing the conductive part in the biometric feature attack object, some biometric feature attack objects that are not electrically conductive and can be only manually tested can be electrically conductive, and the biometric feature attack objects can be automatically detected, thereby effectively reducing labor costs, shortening a test period, and reducing a test error.

To make a person skilled in the art better understand the technical solutions in the present specification, the following clearly and comprehensively describes the technical solutions in the embodiments of the present specification with reference to the accompanying drawings in the embodiments of the present specification. Clearly, the described embodiments are merely some but not all of the embodiments of the present specification. All other embodiments obtained by a person of ordinary skill in the art based on the embodiments of the present specification without creative efforts shall fall within the protection scope of the present specification.

Figure 1:
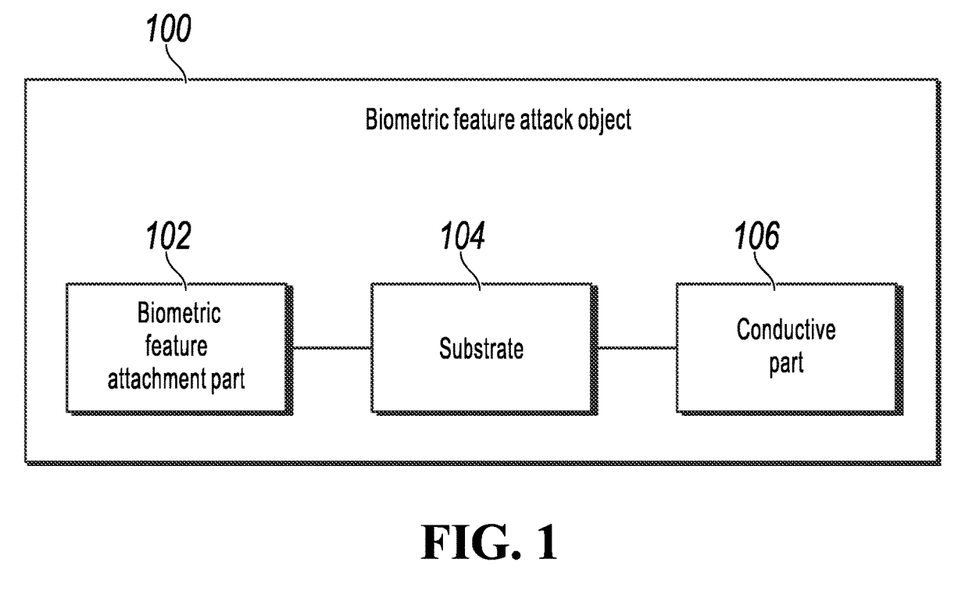
FIG. 1 is a schematic structural diagram of a first biometric feature attack object, according to embodiments of the present specification.

The embodiments of the present specification provide a biometric feature attack object. FIG. 1 is a schematic structural diagram of a first biometric feature attack object 100, according to embodiments of the present specification. The biometric feature attack object 100 includes a substrate 101, a biometric feature attachment part 102, and a conductive part 103.

The substrate 101 can be a part for carrying the biometric feature attachment part 102 and the conductive part 103. The substrate 101 can be made of a soft material or a hard material. For example, the substrate 101 can be paper or a film material made of a soft material. Alternatively, the substrate 101 can be paper or a film material made of a hard material, etc. In a process that a mechanical arm is used to simulate a human in pressing the biometric feature attack object to detect the biometric feature attack object, because the soft material is too soft (for example, hardness of the soft material is less than a first predetermined threshold), the substrate 101 may be deformed after the mechanical arm performs a plurality of operations on the substrate 101. When the hard material of which the substrate 101 is made is excessively hard (for example, hardness of the hard material is greater than a second predetermined threshold), in a process of testing the biometric feature attack object by using the mechanical arm, a large position offset may be generated, due to the substrate 101 made of the hard material, when the mechanical arm presses the biometric feature attack object, and consequently accuracy of detecting the biometric feature attack object is affected. Based on this, the selected soft material or hard material of which the substrate 101 is made in the embodiments of the present specification is a material whose hardness meets a certain hardness threshold. A specific threshold of the hardness of the material of which the substrate 101 is made is not specifically limited in the embodiments of the present specification.

The substrate 101 can be a planar structure, and a shape of the planar structure can be a regular pattern or an irregular pattern. For example, the regular pattern can be a rectangle, a circle, a triangle, or an ellipse. Alternatively, the substrate 101 can be a three-dimensional structure. A specific structure of the substrate 101 is not specifically limited in the embodiments of the present application.

The substrate 101 can include a biometric feature carrying area and a pressing area. The biometric feature carrying area and the pressing area can be respectively disposed on two opposite sides of the substrate. Alternatively, the biometric feature carrying area and the pressing area can be disposed on the same side of the substrate.

A biometric feature can be a fingerprint feature, a palmprint feature, etc. The biometric feature attachment part 102 can be a part to which the biometric feature can be attached. In implementation, sample data of the biometric feature collected in advance can be attached to the biometric feature attachment part 102. When the biometric feature needs to be tested, the biometric feature attachment part 102 to which the biometric feature is attached can be tested.

The conductive part 103 can be made of a conductive material, for example, conductive ink or conductive silica that can be used for performing a biometric feature test. The conductive part is used to play a conductive role. By disposing the conductive part in the biometric feature attack object, some biometric feature attack objects that are not electrically conductive and can be only manually tested can be electrically conductive, thereby effectively avoiding a problem that in a manual detection process, there is high labor costs, a long test period, and a large test error. A biometric recognition processing process varies with biometric features, and therefore the biometric feature carrying area 1011 and the pressing area 1012 can be disposed at different positions on the substrate 101. For example, when the biometric feature is a fingerprint, to test the part to which the fingerprint feature is attached, the pressing area needs to be disposed in the biometric feature attack object in consideration of that a pressing action of a human finger needs to be simulated in the test process, so that in the automatic test process, after the test device (for example, such as devices that includes the mechanical arm or a camera component) identifies the biometric feature attack material, the mechanical arm can be controlled for the pressing area in the identified biometric feature attack material to press the pressing area in the biometric feature attack material, to perform a biometric recognition attack test on a biometric recognition device. The pressing area and the biometric feature carrying area can be respectively disposed on the two opposite sides of the substrate.

Figure 2:
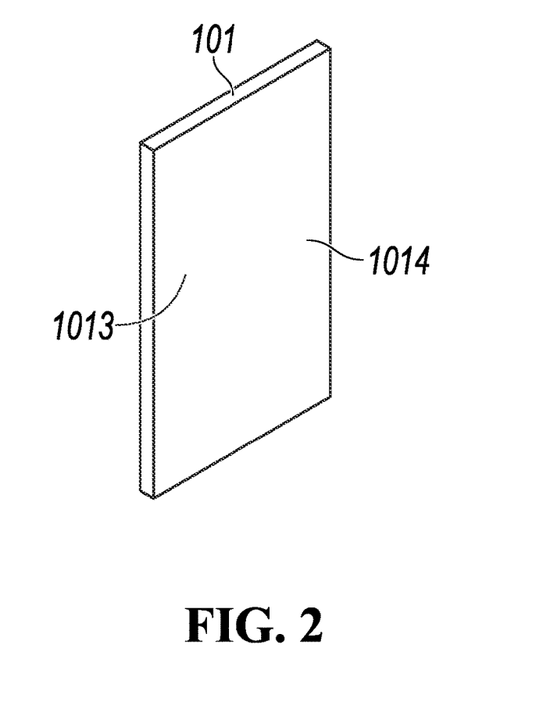
FIG. 2 is a schematic structural diagram of a substrate, according to embodiments of the present specification.

To better describe the processing process, the following provides detailed description by using an example in which the biometric feature is a fingerprint feature. FIG. 2 is a schematic structural diagram of a substrate, according to embodiments of the present specification. The substrate 101 can include a first side 1013 and a second side 1014. The first side 1013 and the second side 1014 can be disposed as a front side and a back side of the substrate 101. The first side 1013 can be disposed as the front side of the substrate 101, and the second side 1014 can be disposed as the back side of the substrate 101. Alternatively, the first side 1013 can be disposed as the back side of the substrate 101, and the second side 1014 can be disposed as the front side of the substrate 101. Alternatively, the first side 1013 and the second side 1014 are two different sides. The substrate 101 is formed by oppositely gluing one side of the first side 1013 and one side of the second side 1014.

In implementation, the substrate can include a biometric feature carrying area and a pressing area. The biometric feature carrying area can be disposed on the first side of the substrate, and the pressing area can be disposed on the second side of the substrate. A biometric feature attachment part can be disposed in the biometric feature carrying area. A conductive part can be disposed in the pressing area or the biometric feature carrying area.

Figure 3:
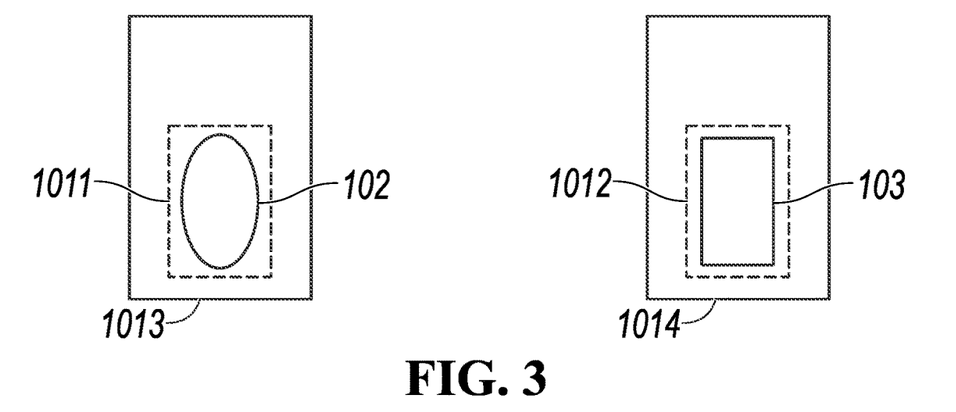
FIG. 3 is a schematic structural diagram of a second biometric feature attack object, according to embodiments of the present specification.

Specifically, when the conductive part is disposed in the pressing area, FIG. 3 is a schematic structural diagram of another biometric feature attack object, according to embodiments of the present specification. As shown in FIG. 3, the biometric feature attack object includes a substrate 101, a biometric feature attachment part 102, and a conductive part 103. The substrate 101 can include a first side 1013 and a second side 1014. The substrate 101 can include a biometric feature carrying area 1011 and a pressing area 1012. The biometric feature carrying area 1011 can be disposed on the first side 1013 of the substrate 101, and the pressing area 1012 can be disposed on the second side 1014 of the substrate 101. The biometric feature attachment part 102 can be disposed in the biometric feature carrying area 1011. The conductive part 103 can be disposed in the pressing area 1012.

Figure 4:
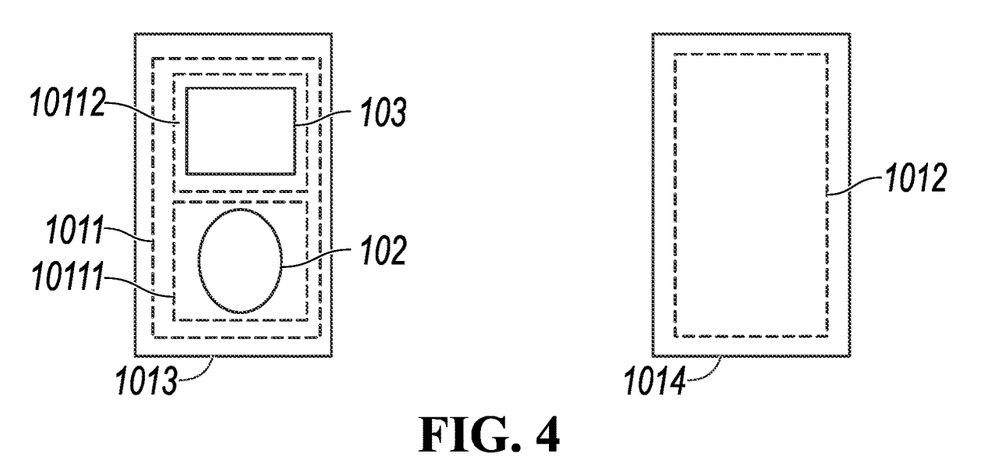
FIG. 4 is a schematic structural diagram of a third biometric feature attack object, according to embodiments of the present specification.

When the conductive part is disposed in the biometric feature carrying area, FIG. 4 is a schematic structural diagram of another biometric feature attack object, according to embodiments of the present specification. As shown in FIG. 4, the biometric feature attack object includes a substrate 101, a biometric feature attachment part 102, and a conductive part 103. The substrate 101 can include a first side 1013 and a second side 1014. The substrate can include a biometric feature carrying area 1011 and a pressing area 1012. The biometric feature carrying area 1011 can be disposed on the first side 1013 of the substrate, and the pressing area 1012 can be disposed on the second side 1014 of the substrate. The biometric feature carrying area 1011 can include a first carrying area 10111 and a second carrying area 10112. The conductive part 103 can be disposed in the first carrying area 10111 of the biometric feature carrying area 1011, and the biometric feature attachment part 102 can be disposed in the second carrying area 10112 of the biometric feature carrying area 1011. Alternatively, the conductive part 103 can be disposed in the second carrying area 10112 of the biometric feature carrying area 1011, and the biometric feature attachment part 102 can be disposed in the first carrying area 10111 of the biometric feature carrying area 1011. Implementations are not specifically limited in the embodiments of the present specification.

Figure 5:
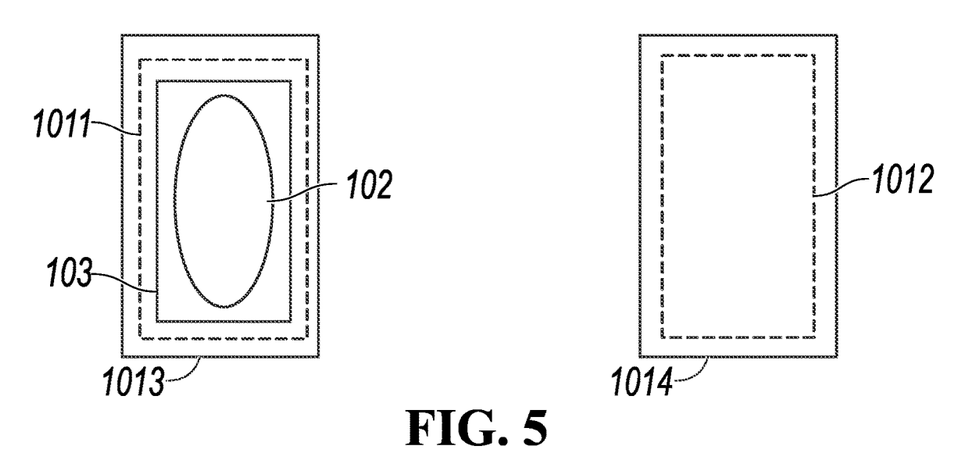
FIG. 5 is a schematic structural diagram of a fourth biometric feature attack object, according to embodiments of the present specification.

Alternatively, when the conductive part is disposed in the biometric feature carrying area, and the conductive part is in a sheet structure, FIG. 5 is a schematic structural diagram of another biometric feature attack object, according to embodiments of the present specification. As shown in FIG. 5, the biometric feature attack object includes a substrate 101, a biometric feature attachment part 102, and a conductive part 103. The substrate 101 can include a first side 1013 and a second side 1014. The substrate 101 can include a biometric feature carrying area 1011 and a pressing area 1012. The biometric feature carrying area 1011 can be disposed on the first side 1013 of the substrate, and the pressing area 1012 can be disposed on the second side 1014 of the substrate. The conductive part 103 includes a first area and a second area. The first area and the second area are respectively disposed on two opposite sides of the conductive part. The biometric feature attachment part 102 is disposed in the first area, and the second area is disposed in the biometric feature carrying area.

It is worthwhile to note that a part of the conductive structure is the same as the structure of the substrate shown in FIG. 2 in the above-mentioned embodiments of the present specification. For details, references can be made to the structure of the substrate in FIG. 2. Details are omitted here for simplicity.

In implementation, the biometric feature attachment part 102 can be disposed in the biometric feature carrying area 1011 through gluing. There is no biometric feature in an area in which the biometric feature attachment part 102 and the biometric feature carrying area 1011 are glued. After the biometric feature attachment part 102 is disposed in the biometric feature carrying area 1011 through gluing, during subsequent automatic biometric feature testing, a biometric feature area attached to the biometric feature attachment part 102 in the biometric feature attack material can approach a detection area, to perform biometric recognition.

The embodiments of the present specification provide the biometric feature attack object. The biometric feature attack object includes the substrate, the biometric feature attachment part, and the conductive part. The substrate includes the biometric feature carrying area and the pressing area, and the biometric feature carrying area and the pressing area are respectively disposed on two opposite sides of the substrate. The biometric feature attachment part is disposed in the biometric feature carrying area, and the conductive part is disposed in the pressing area or the biometric feature carrying area. As such, by disposing the conductive part in the biometric feature attack object, some biometric feature attack objects that are not electrically conductive and can be only manually tested can be electrically conductive, and the biometric feature attack objects can be automatically detected, thereby effectively avoiding a problem that in a manual detection process, there is high labor costs, a long test period, and a large test error.

Further, a biometric feature in the embodiments of the present specification can include at least a fingerprint and a palmprint. The fingerprint feature or the palmprint feature obtained in advance can be attached to the biometric feature attachment part. Alternatively, the fingerprint feature obtained in advance and the palmprint feature corresponding to the fingerprint feature can be attached to the biometric feature attachment part. Implementations are not limited in the embodiments of the present specification.

Further, the conductive part can be conductive silica gel or a conductive film. The substrate can be made of a non-conductive material. Specifically, the non-conductive material can include a paper material or other non-conductive materials that can be used for the biometric feature attack object.

Further, to test the biometric feature attack object, the biometric feature attack object to be tested needs to be placed at a designated placement position in a target detection area. Therefore, pose estimation needs to be performed for the placement position at which the biometric feature attack object is placed in the target detection area. In addition, considering that there are a large quantity of biometric feature attack objects to be tested, each biometric feature attack object to be tested needs to be identified to facilitate unified management. Based on this, the biometric feature attack object can further include an identity identifier. The identity identifier can be disposed on a side of the substrate on which the pressing area is located, and the identity identifier is located in an area different from the pressing area. The identity identifier and the pressing area are used to determine the placement position of the biometric feature attack object.

The identity identifier can be a graphic code, etc. The graphic code can be further used to identify the biometric feature attack object. The graphic code can be a two-dimensional code, a barcode, etc. with an identity, and can be used with the pressing area to determine the placement position of the biometric feature attack object.

Figure 6:
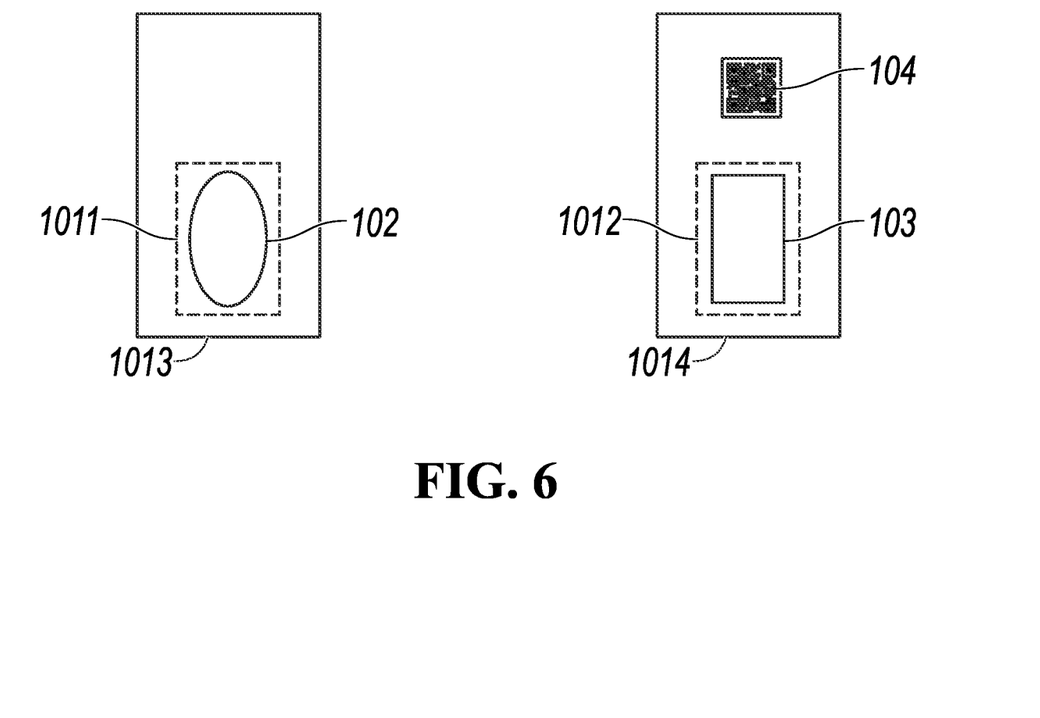
FIG. 6 is a schematic structural diagram of a fifth biometric feature attack object, according to embodiments of the present specification.

Specifically, FIG. 6 is another schematic structural diagram of a biometric feature attack object, according to embodiments of the present specification. As shown in FIG. 6, the biometric feature attack object includes a substrate 101, a biometric feature attachment part 102, a conductive part 103, and an identity identifier 104. The substrate 101 can include a first side 1013 and a second side 1014. The substrate can include a biometric feature carrying area 1011 and a pressing area 1012. The biometric feature carrying area 1011 can be disposed on the first side 1013 of the substrate 101, and the pressing area 1012 can be disposed on the second side 1014 of the substrate 101. The biometric feature attachment part 102 can be disposed in the biometric feature carrying area 1011. The conductive part 103 can be disposed in the pressing area 1012. The identity identifier 104 can be provided on the second side 1014 of the substrate 101, and the identity identifier 104 is located in an area different from the pressing area 1012.

Further, to help a device for testing the biometric feature attack object quickly and accurately determine whether the biometric feature attack object is at a target placement position in a target detection area based on information about a placement position of the biometric feature attack object in the target detection area, the pressing area provided in the embodiments of the present specification can further include a first central point, and the above-mentioned identity identifier can include a second central point. The placement position of the biometric feature attack object can be determined based on a position and pose information of a line connecting the first central point and the second central point.

Figure 7:
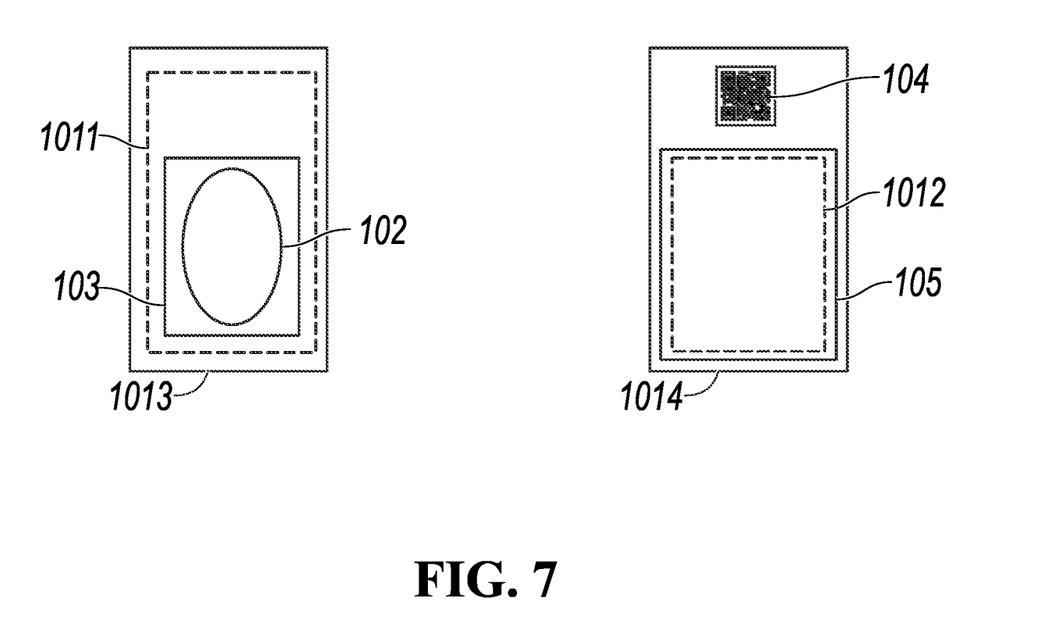
FIG. 7 is a schematic structural diagram of a sixth biometric feature attack object, according to embodiments of the present specification.

The biometric feature attack object can further include a bounding frame 105. The conductive part can be a transparent conductive film, and the transparent conductive film includes a first area and a second area. The first area and the second area are respectively disposed on two opposite sides of the transparent conductive film. As such, when the conductive part is disposed in the biometric feature carrying area, the biometric feature attachment part can be disposed in the biometric feature carrying area through the transparent conductive film. The bounding frame is located on a side of the substrate on which the pressing area is located, and is used to identify the pressing area. The transparent conductive film can be an ITO transparent conductive film.

Specifically, FIG. 7 is a schematic structural diagram of a sixth biometric feature attack object, according to embodiments of the present specification. As shown in FIG. 7, the biometric feature attack object includes a substrate 101, a biometric feature attachment part 102, a conductive part 103, an identity identifier 104, and a bounding frame 105. The substrate 101 can include a first side 1013 and a second side 1014. The substrate 101 can include a biometric feature carrying area 1011 and a pressing area 1012. The biometric feature carrying area 1011 can be disposed on the first side 1013 of the substrate, and the pressing area 1012 can be disposed on the second side 1014 of the substrate. The conductive part 103 includes a first area and a second area. The first area and the second area are respectively disposed on two opposite sides of the conductive part. The biometric feature attachment part 102 is disposed in the first area, and the second area is disposed in the biometric feature carrying area. The identity identifier 104 can be provided on the second side 1014 of the substrate 101, and the identity identifier 104 is located in an area different from the pressing area 1012.

Further, a color of the side of the substrate on which the biometric feature carrying area is located can be determined based on a color of a body part in which a biometric feature is located.

The embodiments of the present specification provide the biometric feature attack object. The biometric feature attack object includes the substrate, the biometric feature attachment part, and the conductive part. The substrate includes the biometric feature carrying area and the pressing area, and the biometric feature carrying area and the pressing area are respectively disposed on two opposite sides of the substrate. The biometric feature attachment part is disposed in the biometric feature carrying area, and the conductive part is disposed in the pressing area or the biometric feature carrying area. As such, by disposing the conductive part in the biometric feature attack object, the biometric feature attack object can be automatically detected, thereby effectively avoiding a problem that in a manual detection process, there is high labor costs, a long test period, and a large test error.

Figure 8:
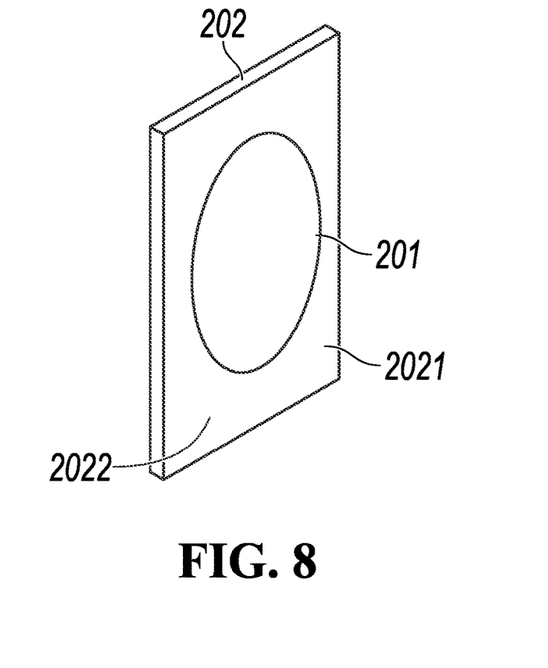
FIG. 8 is a schematic structural diagram of a seventh biometric feature attack object, according to embodiments of the present specification.

In addition, embodiments of the present specification further provide a biometric feature attack object. As shown in FIG. 8, the biometric feature attack object can include a biometric feature attachment part 201 and a conductive part 202. The conductive part 202 includes a biometric feature carrying area 2021 and a pressing area 2022. The biometric feature carrying area 2021 and the pressing area 2022 are respectively disposed on two opposite sides of the conductive part 202. The biometric feature attachment part 201 is disposed in the biometric feature carrying area 2021. It is worthwhile to note that a structure of the conductive part is the same as the structure of the substrate shown in FIG. 2 in the previous embodiment. For details, references can be made to the structure of the substrate shown in FIG. 2.

Further, a biometric feature attached to the biometric feature attachment area includes at least a fingerprint and a palmprint.

Further, the conductive part can be conductive silica gel or a conductive film.

Further, the biometric feature attack object can further include an identity identifier. The identity identifier can be located on a side, of the conductive part, on which the pressing area is located, and the identity identifier is located in an area different from the pressing area. The identity identifier and the pressing area are used to determine a placement position of the biometric feature attack object.

Further, the identity identifier is a graphic code.

Further, the pressing area includes a first central point, the identity identifier includes a second central point, and the placement position of the biometric feature attack object is determined based on a position and pose information of a line connecting the first central point and the second central point.

Further, the conductive part can be a conductive film.

Further, the conductive film can be a transparent conductive film. The transparent conductive film can be an indium tin oxide (ITO) transparent conductive film.

Further, a color of the conductive part can be determined based on a color of a body part in which the biometric feature is located.

The embodiments of the present specification provide the biometric feature attack object. The biometric feature attack object includes the biometric feature attachment part and the conductive part. The conductive part includes the biometric feature carrying area and the pressing area, and the biometric feature carrying area and the pressing area are respectively disposed on the two opposite sides of the conductive. The biometric feature attachment part is disposed in the biometric feature carrying area. As such, by disposing the conductive part in the biometric feature attack object, the biometric feature attack object can be automatically detected, thereby effectively avoiding a problem that in a manual detection process, there is high labor costs, a long test period, and a large test error.

Figure 9:
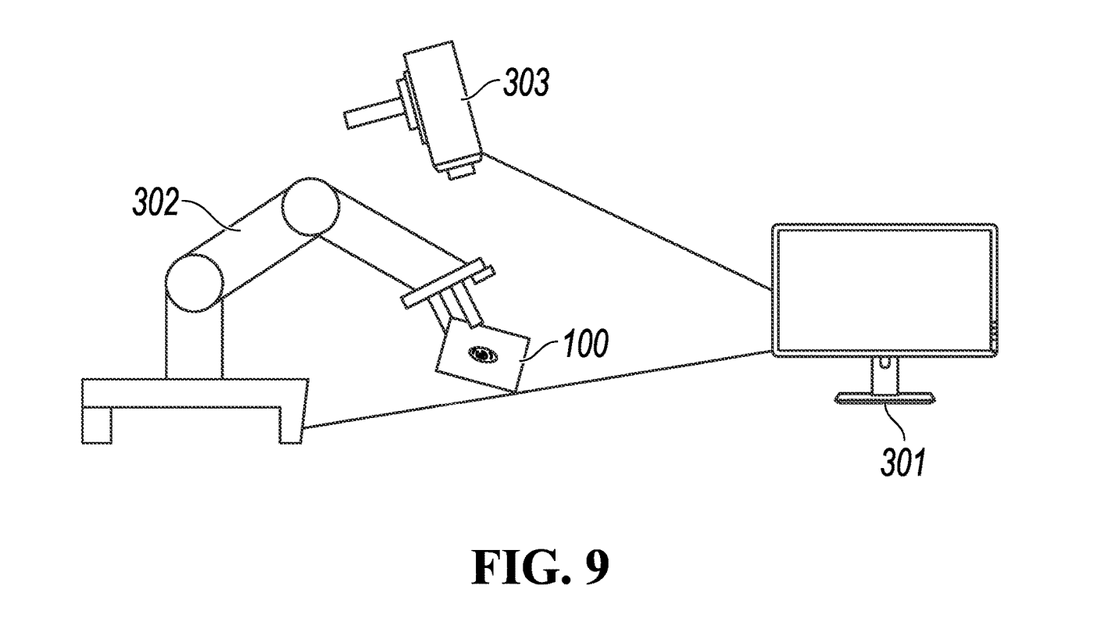
FIG. 9 is a schematic structural diagram of a biometric feature attack test system, according to embodiments of the present specification.

In addition, embodiments of the present specification further provide a biometric feature attack test system. FIG. 9 is a schematic structural diagram of a biometric feature attack test system, according to embodiments of the present specification. The system can include a controller 301, a mechanical arm 302, a camera component 303, and a biometric feature attack object 100. The camera component 303 is configured to obtain the biometric feature attack object 100 needed for performing a biometric recognition attack, and send information about a current position of the biometric feature attack object 100 to the controller 301. The controller 301 is configured to control, based on the information about the current position of the biometric feature attack object 100, the mechanical arm 302 to select the biometric feature attack object 100, and place the biometric feature attack object 100 in a target detection area. The camera component 303 is configured to detect whether the biometric feature attack object 100 is in the target detection area, and send information about a placement position of the biometric feature attack object 100 in the target detection area to the controller 301 when detecting that the biometric feature attack object 100 is not in the target detection area. The controller 301 is configured to control, based on the information about the placement position, the mechanical arm 302 to adjust the placement position of the biometric feature attack object 100 in the target detection area, so that the biometric feature attack object 100 is placed at a target position for biometric recognition in the target detection area, and control the mechanical arm 302 to perform a pressing operation on a pressing area of the biometric feature attack object 100 by simulating a pressing action of a finger, to perform a biometric recognition attack test.

Further, the biometric feature attack object can include an identity identifier and the pressing area. The identity identifier and the pressing area are located on the same side, and the identity identifier is located in an area different from the pressing area. The camera component is configured to obtain images of the pressing area and the identity identifier. The controller is configured to determine, based on the images of the pressing area and the identity identifier, whether the biometric feature attack object is in the target detection area.

Further, the pressing area includes a first central point, and the identity identifier includes a second central point. The controller is configured to determine a tilt angle of the biometric feature attack object in the target detection area based on a position and pose information of a line connecting the first central point and the second central point, and determine the placement position of the biometric feature attack object in the target detection area based on the tilt angle.

The embodiments of the present specification provide the biometric feature attack test system. The system includes the controller, the mechanical arm, the camera component, and the biometric feature attack object. The camera component can obtain the biometric feature attack object needed for performing a biometric recognition attack, and send the information about the current position of the biometric feature attack object to the controller. The controller can control, based on the information about the current position of the biometric feature attack object, the mechanical arm to select the biometric feature attack object, and place the biometric feature attack object in the target detection area. The camera component can detect whether the biometric feature attack object is in the target detection area, and send the information about the placement position of the biometric feature attack object in the target detection area to the controller when detecting that the biometric feature attack object is not in the target detection area. The controller can control, based on the information about the placement position, the mechanical arm to adjust the placement position of the biometric feature attack object in the target detection area, so that the biometric feature attack object is placed at the target position for biometric recognition in the target detection area, and control the mechanical arm to perform the pressing operation on the pressing area of the biometric feature attack object by simulating the pressing action of the finger, to perform the biometric recognition attack test. As such, by disposing the conductive part in the biometric feature attack object, the biometric feature attack object can be automatically detected, thereby effectively avoiding a problem that in a manual detection process, there is high labor costs, a long test period, and a large test error.

Specific embodiments of the present specification are described above. Other embodiments fall within the scope of the appended claims. In some cases, the actions or steps described in the claims can be performed in a sequence different from that in the embodiments, and the desired results can still be achieved. In addition, the process described in the accompanying drawings does not necessarily require a particular sequence or sequential sequence shown to achieve the desired results. In some implementations, multi-tasking and parallel processing can be advantageous.

A person skilled in the art should understand that the embodiments of the present specification can be provided as methods, components, systems, or computer program products. Therefore, the present specification can use a form of hardware only embodiments, software only embodiments, or embodiments with a combination of software and hardware. In addition, the present specification can use a form of a computer program product that is implemented on one or more computer-usable storage media (including but not limited to a disk memory, a CD-ROM, an optical memory, etc.) that include computer-usable program code.

The present specification is described with reference to the flowcharts and/or block diagrams of the method, the device (system), and the computer program product based on the embodiments of the present specification. It should be understood that computer program instructions can be used to implement each process and/or each block in the flowcharts and/or the block diagrams and a combination of processes and/or blocks in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions can be stored in a computer readable memory that can instruct a computer or another programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), input/output interfaces, network interfaces, and memories.

The memory can include a non-persistent memory, a random access memory (RAM), a nonvolatile memory, and/or another form that are in a computer readable medium, for example, a read-only memory (ROM) or a flash memory (flash RAM). The memory is an example of the computer readable medium.

The computer-readable medium includes persistent, non-persistent, removable, and irremovable media that can store information by using any method or technology. The information can be a computer readable instruction, a data structure, a program module, or other data. Examples of a computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a cassette magnetic tape, magnetic tape/magnetic disk storage or another magnetic storage device, or any other non-transmission medium. The computer storage medium can be used to store information accessible by a computing device. Based on the definition in the present specification, the computer readable medium does not include transitory computer readable media (transitory media) such as a modulated data signal and carrier.

It can be understood that the embodiments described in the embodiments of the present specification can be implemented by hardware, software, firmware, middleware, microcode, or a combination thereof. In hardware implementation, a processing unit can be implemented in one or more applications-specific integrated circuits (ASIC), digital signal processors (DSP), digital signal processing devices (DSPD), programmable logic devices (PLD), field programmable gate arrays (FPGA), general-purpose processors, controllers, microcontrollers, microprocessors, other electronic units for performing the functions described in the present specification, or combinations thereof.

In software implementation, the technologies described in the embodiments of this specification can be implemented by modules that perform the functions (for example, processes or functions) described in the embodiments of the present specification. Software code can be stored in a memory and executed by a processor. The memory can be implemented in or outside the processor.

It is worthwhile to further note that in the present specification, the terms "include", "comprise", and their any other variants are intended to cover a nonexclusive inclusion, so that a process, a method, a product, or a device that includes a series of elements not only includes these elements, but also includes other elements which are not expressly listed, or further includes elements inherent to such process, method, product, or device. An element described by "includes a . . . " further includes, without more constraints, another same or identical element in the process, method, product, or device that includes the element.

In the previous description of the implementations, a person skilled in the art can clearly understand that the embodiments can be implemented by software in addition to a necessary universal hardware platform or certainly can be implemented by hardware. However, in most cases, the former is the preferred implementation. Based on such an understanding, the technical solutions of the present specification, essentially or the part contributing to the existing technology, can be embodied in a form of a software product. The software program product can be stored in a storage medium (for example, a ROM/RAM, a hard disk, or a compact disc), and includes several instructions for instructing a terminal (which can be a mobile phone, a computer, a server, an air conditioner, or a network device) to perform the methods described in the embodiments of the present specification.

The embodiments of the present specification are described above with reference to the accompanying drawings. However, the present specification is not limited to the previous specific implementations. The previous specific implementations are merely illustrative but not limiting. Based on the present specification, a person of ordinary skill in the art can make various modifications and changes to the present specification without departing from the spirit and the scope of the claims of the present specification. Any modifications, equivalent replacements, and improvements made within the spirit and the principle of the present specification shall fall within the scope of the claims in the present specification.

What is claimed is:

1. A system for performing biometric feature attack tests, wherein the system comprises:
    a biometric feature attack object, comprising a substrate, a biometric feature attachment part, and a conductive part, wherein:
    the substrate comprises a biometric feature carrying area and a pressing area, and the biometric feature carrying area and the pressing area are respectively disposed on two opposite sides of the substrate;
    the biometric feature attachment part is disposed in the biometric feature carrying area, wherein the biometric feature attack object further comprises an identity identifier, wherein the identity identifier is located on a side of the substrate on which the pressing area is located and in an area different from the pressing area, and wherein the identity identifier and the pressing area are used to define a placement position of the biometric feature attack object; and
    the conductive part is disposed in the pressing area or the biometric feature carrying area;
    wherein the pressing area comprises a first central point, the identity identifier comprises a second central point, and the placement position of the biometric feature attack object is defined by pose information of a line connecting the first central point and the second central point.

2. The system according to claim 1, wherein the biometric feature comprises at least a fingerprint or a palmprint.

3. The system according to claim 1, wherein the conductive part is conductive silica gel or a conductive film.

4. The system according to claim 1, wherein the substrate is made of a non-conductive material.

5. The system according to claim 4, wherein the substrate is made of a paper material.

6. The system according to claim 1, wherein the identity identifier is a graphic code.

7. The system according to claim 3, wherein the biometric feature attack object further comprises a bounding frame located on a side of the substrate on which the pressing area is located and used to identify the pressing area.

8. The system according to claim 3, wherein the conductive film is a transparent conductive film disposed in the biometric feature carrying area, and wherein the biometric feature attachment part is disposed in the biometric feature carrying area by using the transparent conductive film.

9. The system according to claim 8, wherein the transparent conductive film comprises a first area and a second area, and the first area and the second area are respectively disposed on two opposite sides of the transparent conductive film; and
the biometric feature attachment part is disposed in the first area, and the second area is disposed in the biometric feature carrying area.

10. The system according to claim 8, wherein a color of a side of the substrate on which the biometric feature carrying area is located is determined based on a color of a body part that has the biometric feature.

11. The system according to claim 8, wherein the transparent conductive film is an ITO transparent conductive film.

12. The system according to claim 1, wherein the system further comprises a controller, a mechanical arm, and a camera component, wherein the camera component is configured to:
obtain the biometric feature attack object for performing a biometric recognition attack;
send information about a current position of the biometric feature attack object to the controller; and
detect whether the biometric feature attack object is in a target detection area and, when detecting that the biometric feature attack object is not in the target detection area, send information about a placement position of the biometric feature attack object in the target detection area to the controller.

13. The system according to claim 12, wherein the controller is configured to:
control, based on the information about the current position of the biometric feature attack object, the mechanical arm to select the biometric feature attack object, and place the biometric feature attack object in the target detection area;
control, based on the information about the placement position, the mechanical arm to adjust the placement position of the biometric feature attack object in the target detection area, so that the biometric feature attack object is placed at a target position for biometric recognition in the target detection area; and
control the mechanical arm to perform a pressing operation on a pressing area of the biometric feature attack object by simulating a pressing action of a finger, to perform a biometric recognition attack test.

14. The system according to claim 13, wherein:
the camera component is configured to obtain images of the pressing area and the identity identifier, and
wherein the controller is configured to determine, based on the images of the pressing area and the identity identifier, whether the biometric feature attack object is in the target detection area.

15. The system according to claim 14, wherein the controller is configured to:
determine a tilt angle of the biometric feature attack object in the target detection area based on the pose information of the line connecting the first central point and the second central point; and
determine the placement position of the biometric feature attack object in the target detection area based on the tilt angle.

* * * * *